(12) United States Patent
Ahlemeyer et al.

(10) Patent No.: US 10,090,086 B2
(45) Date of Patent: Oct. 2, 2018

(54) SPACE-SAVING ISOLATING ARRESTER

(71) Applicant: PHOENIX CONTACT GMBH & CO. KG, Blomberg (DE)

(72) Inventors: Jurgen Ahlemeyer, Marienmunster (DE); Peter Berg, Schlangen (DE); Thorsten Heil, Bad Salzuflen (DE); Ralf Lange, Horn-Bad Meinberg (DE); Andrei Siegel, Paderborn (DE); Steffen Pfortner, Springe (DE); Oliver Thoren, Schieder-Schwalenberg (DE)

(73) Assignee: PHOENIX CONTACT GMBH & CO. KG (DE)

( * ) Notice: Subject to any disclaimer, the term of this patent is extended or adjusted under 35 U.S.C. 154(b) by 0 days.

(21) Appl. No.: 15/608,636

(22) Filed: May 30, 2017

(65) Prior Publication Data

US 2017/0345534 A1    Nov. 30, 2017

(30) Foreign Application Priority Data

May 31, 2016  (DE) .......................... 10 2016 209 365

(51) Int. Cl.
*H02H 1/00*     (2006.01)
*H01C 7/12*     (2006.01)
(Continued)

(52) U.S. Cl.
CPC .............. *H01C 7/12* (2013.01); *H01H 9/167* (2013.01); *H01H 37/761* (2013.01); *H02H 9/042* (2013.01); *H01H 2037/762* (2013.01)

(58) Field of Classification Search
USPC ................................................ 361/117–128
See application file for complete search history.

(56) References Cited

U.S. PATENT DOCUMENTS 5,986,870 A * 11/1999 Kapp .................... H01C 1/028
                                                  340/662
6,430,019 B1    8/2002 Martenson et al.
(Continued)

FOREIGN PATENT DOCUMENTS

DE          9010246       10/1990
DE          4241311        6/1994
(Continued)

OTHER PUBLICATIONS

Search Report prepared by the German Patent Office dated Jan. 17, 2017, for German Patent Application No. 10 2016 209 365.7.
(Continued)

*Primary Examiner* — Danny Nguyen
(74) *Attorney, Agent, or Firm* — Sheridan Ross P.C.

(57) ABSTRACT

The invention relates to a space-saving isolating arrester, having
for at least two electronic components ($EB_1$, $EB_2$) to be monitored,
with the electronic components to be monitored being fastened to a carrier (P) using a thermally softenable fixing means,
with an energy accumulator ($D_1$, $D_2$) being arranged on each of the electronic components which—when a thermally softenable fixing means softens—displaces the associated electronic component substantially parallel to the carrier (P), thereby disconnecting the associated electronic component,
and also having a mechanically displaceable display means (ANZ), with the mechanically displaceable display means indicating that one or more of the electronic components to be monitored has been disconnected, and with the mechanically displaceable display means (ANZ) being displaced by a disconnecting electronic component.

20 Claims, 3 Drawing Sheets

(51) Int. Cl.
*H01H 9/16* (2006.01)
*H01H 37/76* (2006.01)
*H02H 9/04* (2006.01)

(56) References Cited

U.S. PATENT DOCUMENTS

2002/0054465 A1* 5/2002 Gerlach .................... H01T 4/06
  361/111
2014/0327990 A1* 11/2014 Juricev .................. H01C 7/126
  361/14
2015/0103462 A1* 4/2015 Depping ................ H01C 7/126
  361/124

FOREIGN PATENT DOCUMENTS

| DE | 69503743 T2 | 3/1999 |
| DE | 69904274 | 8/2003 |
| DE | 102008061323 B3 | 6/2010 |
| DE | 202010014430 U1 | 3/2011 |
| RU | 2101795 | 1/1998 |
| RU | 2396630 | 8/2010 |
| SU | 1376818 | 8/1999 |

OTHER PUBLICATIONS

Official Action for Russia Patent Application No. 2017117619/07, dated May 30, 2018, 7 pages.

* cited by examiner

SPACE-SAVING ISOLATING ARRESTER

CROSS-REFERENCE TO RELATED APPLICATIONS

This application claims the benefit of German Patent Application No. DE 10 2016 209 365.7 filed May 31, 2016, the entire contents of which are incorporated herein by reference.

FIELD

The invention relates to a space-saving isolating arrester.

BACKGROUND

Electrical devices are dependent on electrical energy. Electrical energy is often made available via a distribution network. Overvoltage can occur due to faulty circuits, network failures, lightning strikes, or other phenomena.

Such overvoltage poses a hazard for connected electrical equipment (and for the distribution network as well). It can result in a malfunction or to damage ranging all the way to total destruction.

For this reason, many electrical devices (and/or their distribution network) are equipped with overvoltage protection, whether to protect investments or to comply with normative requirements.

This overvoltage protection is fault-prone, however, whether due to excessive power to be discharged or frequent response as a result of excess voltage. Such faults can lead to the destruction of the overvoltage protection element, to pronounced thermal heating, or even to fires and the development of smoke gas, which are potentially hazardous for equipment and people in the environment.

If a fault occurs, then the corresponding overvoltage protection element is either disconnected by means of suitable devices, thereby interrupting the power supply, or short-circuited in order to trigger the disconnection of an upstream in-line fuse.

One example of an isolating arrester is the thermal fuse known from DE 90 102 46 U1, for example, which is associated with a component in order to enable shutdown upon heating.

Due to the limited thermal coupling possibilities, this arrangement is not suitable for very rapid temperature increases.

Other devices for disconnection or short-circuiting are described in the applicant's patent DE 42 41 311 as well as in DE 699 04 274 T2 and in U.S. Pat. No. 6,430,019.

The solutions described in the above documents are based on the principle that the component to be monitored is connected in a thermosensitive manner via a contact element, generally a solder connection. The contact element mounted so as to be prestressed, or a force of a second prestressed element, such as a spring, acts on the contact element. If the spring force exceeds the cohesion of the thermosensitive contact point, e.g., soldering point, the contact opens and the monitored component is switched off.

However, the previous arrangements are extremely space-consuming and expensive to manufacture.

It would therefore be desirable for solutions to be provided that can be used in small installations and/or can be manufactured cost-effectively.

In addition, it would be desirable for a device to be provided that can also be used for a multitude of components to be monitored and/or can be manufactured cost-effectively.

SUMMARY

The object is achieved by a device according to claim 1. Additional advantageous embodiments particularly constitute the subject matter of the dependent claims.

BRIEF DESCRIPTION OF THE DRAWINGS

The invention is explained in further detail below with reference to the figures.

DETAILED DESCRIPTION

The figures show an exemplary space-saving isolating arrester 1 according to embodiments of the invention. The illustrations show an arrangement with two components $EB_1$ and $EB_2$ to be monitored, but the invention is not limited to this. That is, the functional principles can also be implemented with only one electronic component $EB_1$ to be monitored and with more than two components $EB_1$, $EB_2$ to be monitored.

The electronic components $EB_1$, $EB_2$ to be monitored are fastened to a carrier P—a circuit board, for example—using a thermally softenable fixing means. The thermal fixation can also perform other functions, such as the establishing of an electrical connection, for example.

An energy accumulator $D_1$, $D_2$ is arranged on each of the electronic components $EB_1$, $EB_2$. That is, energy accumulator $D_1$ is arranged on the electronic component $EB_1$, while energy accumulator $D_2$ is arranged on the electronic component $EB_2$.

If a thermally softenable fixing means is now softened on an electronic component, the energy stored is released from the associated energy accumulator and the associated electronic component is displaced substantially parallel to the carrier P, thus disconnecting the associated electronic component.

Figure 1:
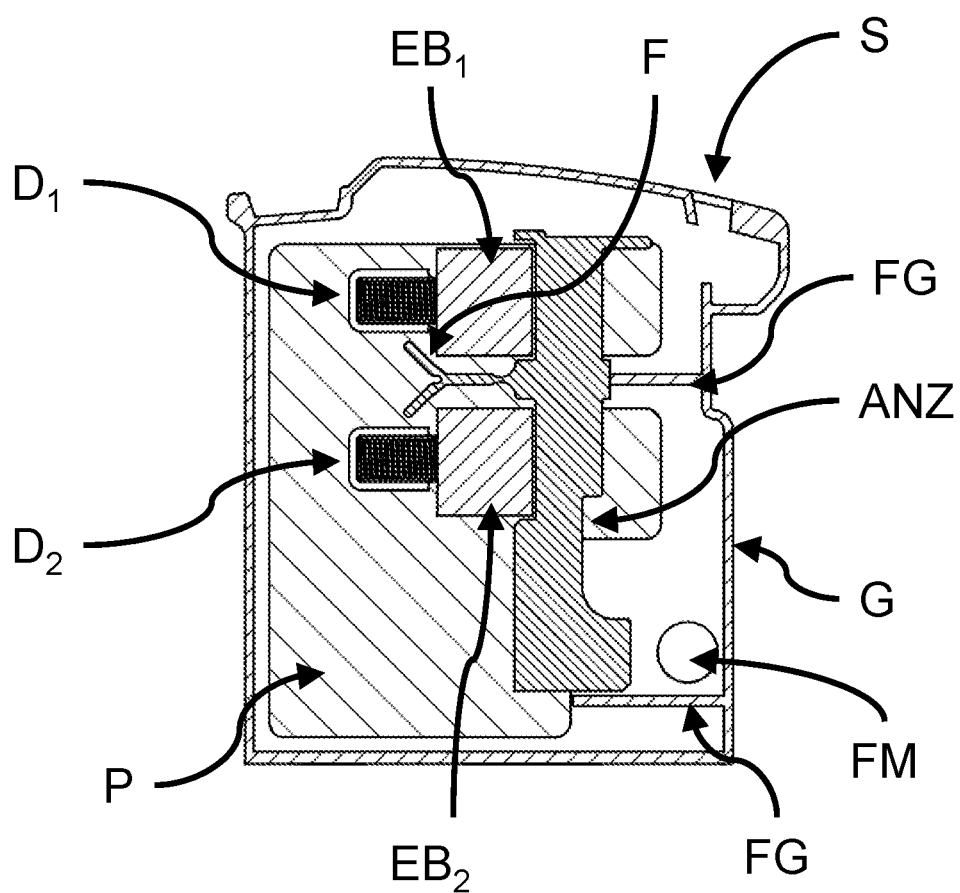
FIG. 1 shows a schematic cross section of an isolating arrester according to the invention in an exemplary first state.
Figure 2:
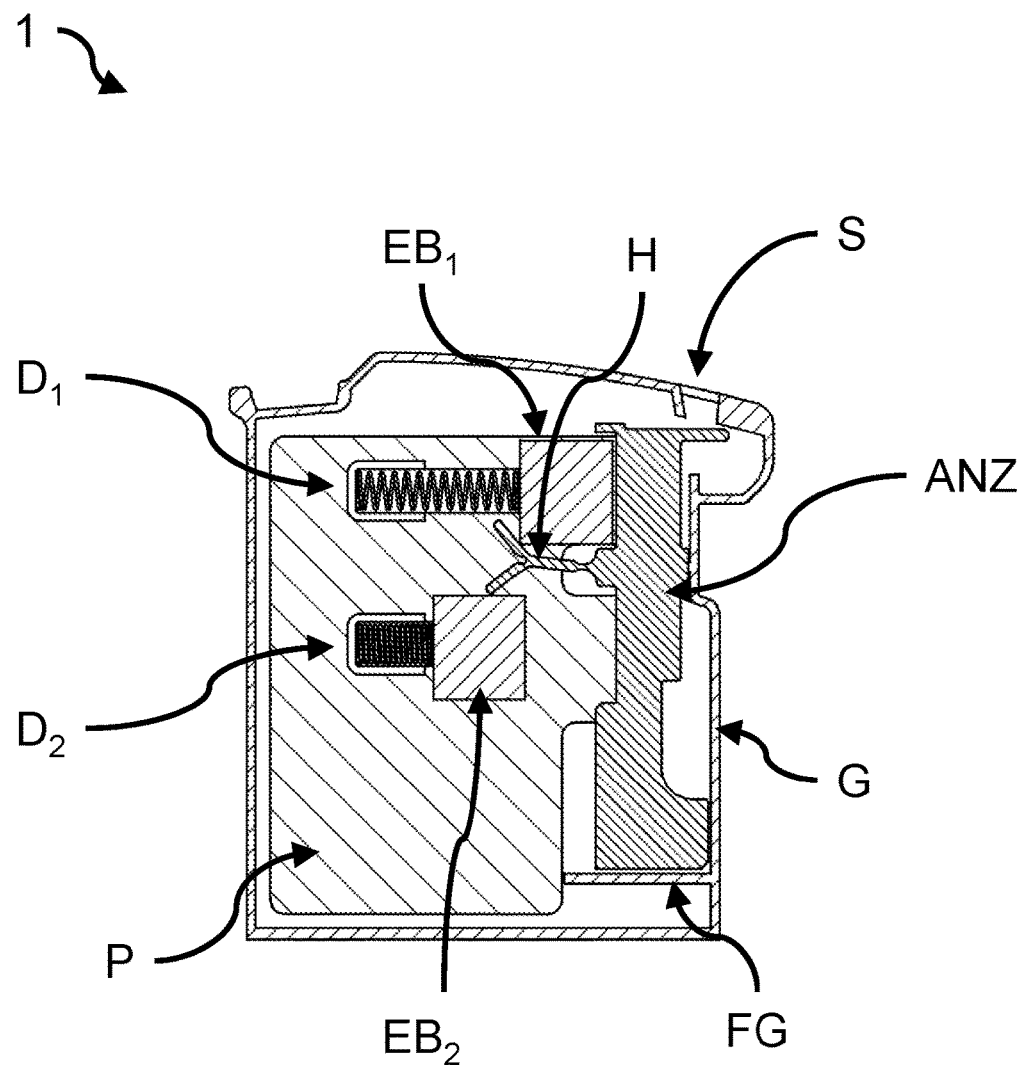
FIG. 2 shows a schematic cross section of the isolating arrester according to the invention in an exemplary second state.
Figure 3:
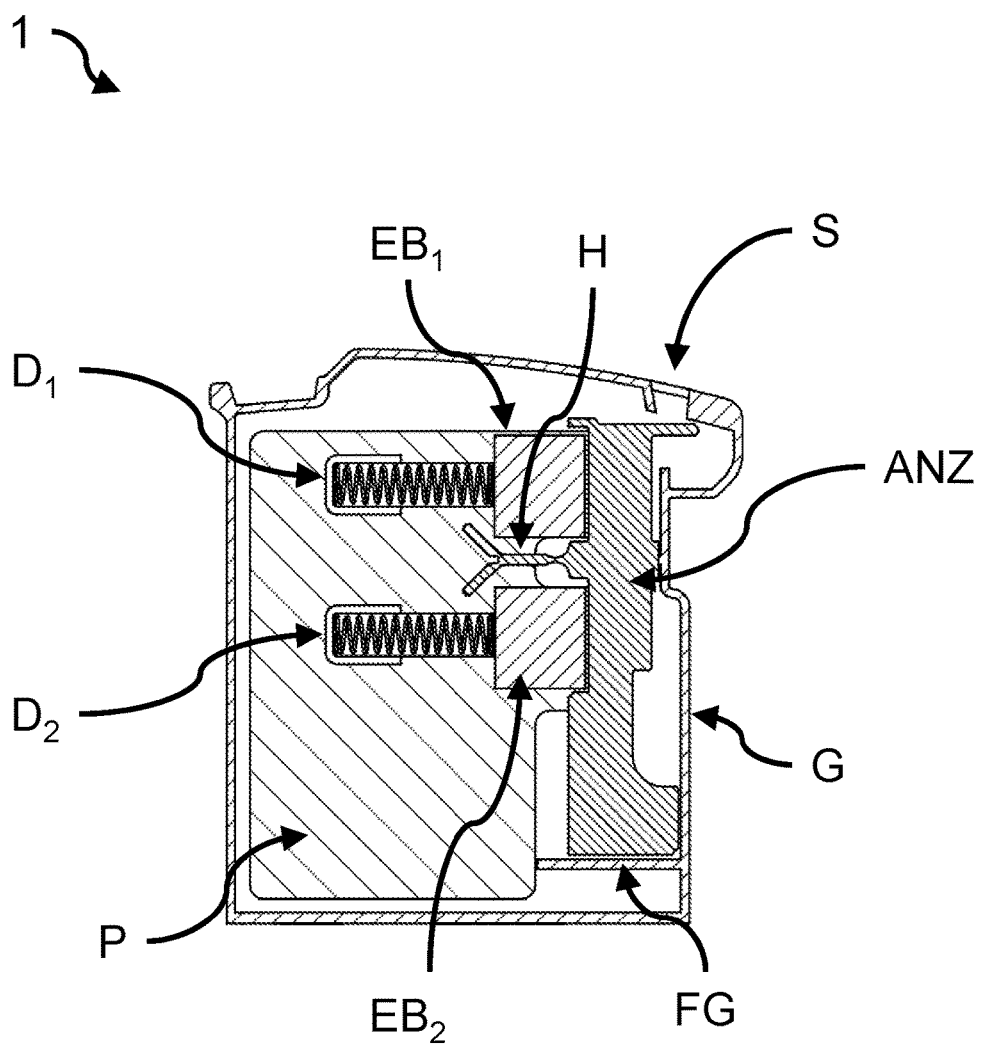
FIG. 3 shows a schematic cross section of the isolating arrester according to the invention in an exemplary third state.

While FIG. 1 shows the initial state, i.e., the non-tripped state, the electronic component $EB_1$ to be monitored has been tripped in FIG. 2. In other words, the thermal fixing means for the carrier P has softened, and the electronic component $EB_1$ to be monitored has been displaced by the energy from the energy accumulator $D_1$ parallel to the carrier. The electronic component $EB_1$ to be monitored has thereby been separated from its electrical connections (not shown). In FIG. 3, in turn, both the electronic component $EB_1$ to be monitored and the electronic component $EB_2$ to be monitored are tripped. The electronic component $EB_1$ to be monitored has thereby been separated from its electrical connections (not shown). Likewise, the electronic component $EB_2$ to be monitored has been simultaneously separated from its electrical connections (not shown).

Moreover, the exemplary space-saving isolating arrester 1 also has a mechanically displaceable display means ANZ, with the mechanically displaceable display means indicating that at least one of the electronic components to be monitored has been disconnected, and with the mechanically displaceable display means ANZ being displaced by a disconnecting electronic component.

With the design described above, it is possible to provide a space-saving isolating arrester that can also be produced cost-effectively. In a viewing window S of a housing G, for example, the space-saving isolating arrester 1 shows a change in color and/or transparency. This change serves as a local indicator for operability/inoperability.

Thus, in the event of unacceptable heating of at least one of the electronic components, it is now possible to disconnect the respective electronic component with little installation space being required. The device can shut down reliably even in the event of large temperature increases. What is more, the device is cost-effective to manufacture. In addition, the disconnection of an electronic component or of several electronic components can be signaled.

| Electronic component $EB_1$ | Electronic component $EB_2$ | Viewing window S |
| --- | --- | --- |
| not disconnected | not disconnected | OK |
| disconnected | not disconnected | defective |
| not disconnected | disconnected | defective |
| disconnected | disconnected | defective |

In one advantageous embodiment, the mechanically displaceable display means ANZ has a device F for fixing the mechanically displaceable display means ANZ in the starting position. That is, in FIG. 1 the fixing device F has the effect that the mechanical display means is held by the electronic component $EB_1$ fixed on the carrier P (and also by the electronic component $EB_2$ fixed on the carrier P).

In other words, the display means can simply be set in place with the electronic components to be monitored after the mounting of the carrier P. As a result, manufacturing costs can be kept low.

In another advantageous embodiment, the isolating arrester 1 for a disconnected electronic component to be monitored has a fixing device F in a disconnected state.

In FIG. 2, for example, the fixing device F is embodied such that the disconnected electronic component $EB_1$ is held in the (closed) housing by means of a fixing device F, so that it does not have any contact to its electrical connections. It is demonstrated in FIG. 3 that the fixing device F can be embodied such that any disconnected electronic component $EB_1$, $EB_2$ is held in the (closed) housing by means of a fixing device F, so that it does not have any contact to its respective electrical connections. It should be noted that the design as shown in the figures also makes it possible—after the first electronic component $EB_1$ has been disconnected, for example—for the second electronic component $EB_2$ to also be disconnected but nonetheless held securely by the fixing device F (as shown in FIG. 3).

The fixing device F prevents tripped, disconnected electronic components from producing short circuits elsewhere.

Alternatively or in addition, a "trapping" solder pad can also be provided on the carrier P, so that any residual liquid solder on the connections of the tripped electronic component is cooled there, thereby fixing the disconnected electronic component.

In another advantageous embodiment, the fixing device F and the mechanically displaceable display means ANZ are integrally formed, with the fixing device F being flexible relative to the mechanically displaceable display means ANZ. As can be seen in comparing FIG. 2 and FIG. 3, manufacturing costs can be kept low in this way.

For the purpose of fixation in the initial state or final state, the fixing devices F are embodied as chamfers, so that a "tripped" electronic component can slide together with the mechanically displaceable display means ANZ past a non-"tripped" electronic component (see FIG. 2).

Moreover, in one embodiment of the invention, first guide means FG can also be provided in the housing G in order to guide the mechanical display means. For example, they can be integrally formed inexpensively in an injection-molding process.

In another advantageous embodiment of the invention, second guide means can also be provided in the housing in order to guide an electronic component to be disconnected.

In an advantageous embodiment of the invention, the energy accumulators $D_1$, $D_2$ are springs. After the fixation of the electronic components $EB_1$ and $EB_2$ these can be introduced at low cost, thus eliminating the need for a laborious fastening of the electronic components $EB_1$ and $EB_2$ during fixation on the carrier P.

The space-saving isolating arrester can be easily provided with devices for mounting on a supporting rail.

The invention is suitable for all types of electronic components to be monitored. In particular, the electronic components are selected from a group which includes semiconductors, particularly varistors, TVS diodes, or gas discharge tubes.

In another advantageous embodiment of the invention, the thermally softenable fixing means has a solder or an adhesive. That is, the electronic component can be fixed on the carrier P by means of a thermally softenable solder, which also provides an electrical connection. Alternatively or in addition, a thermally softenable adhesive can also fix the electronic component on the carrier P.

The housing G and/or the mechanically displaceable display means ANZ are preferably made of a plastic material.

Without limiting the generality, a provision can also be made that each of the isolating arresters 1 has its own telecommunication device. This enables faults to be additionally reported to a remote user.

Alternatively or in addition, passive optical summary remote signaling can also be provided for several adjoining isolating arresters 1 according to the invention. This is apparent from FIG. 1, in which a remote signaling port FM that is open in the initial state and covered in the event of a fault (FIGS. 2 and 3) is provided in the housings G. If the adjoining isolating arresters 1 according to the invention are now arranged next to one another (on a rail) such that a light beam can pass through all of the remote signaling ports, the reflection or lack of transmission can be evaluated as a common alarm by means of a light-sensitive element, thus making a cost-effective common alert available. That is, when several space-saving isolating arresters 1 are arranged next to one another, they provide a common fault reporting in the normal direction toward the carrier P.

LIST OF REFERENCE SYMBOLS

Isolating arrester 1
Electronic components $EB_1$, $EB_2$
Carrier P
Energy accumulators $D_1$, $D_2$
Mechanically displaceable display means ANZ
Fixing device F
Viewing window S
Housing G
Guide means in the housing FG
Remote signaling window FM

What is claimed is:

1. A space-saving isolating arrester, comprising:
   at least two electronic components fastened to a carrier using a thermally softenable fixing means;
   an energy accumulator arranged on each of the at least two electronic components which, when the thermally softenable fixing means softens, displaces an associated electronic component of the at least two electronic components substantially parallel to the carrier, thereby disconnecting the associated electronic component; and
   a mechanically displaceable display means to indicate that one or more of the at least two electronic components has been disconnected, wherein the mechanically displaceable display means is displaced by a disconnecting electronic component.

2. The device as set forth in claim 1, wherein the mechanically displaceable display means has a fixing device for fixing the mechanically displaceable display means in a starting position.

3. The device as set forth in claim 1, further comprising:
   a fixing device for fixing a disconnected electronic component in a disconnected state.

4. The device as set forth in claim 2, wherein the fixing device and the mechanically displaceable display means are integrally formed with the fixing device being flexible relative to the mechanically displaceable display means.

5. The device as set forth in claim 1, further comprising:
   a housing with a first guide means being provided in the housing in order to guide the mechanical display means.

6. The device as set forth in claim 5, wherein
   a second guide means is provided in the housing in order to guide an electronic component to be disconnected.

7. The device as set forth in claim 1, wherein the energy accumulators are springs.

8. The device as set forth in claim 1, wherein the mechanically displaceable display means makes a change in color and/or a change in transmission available.

9. The device as set forth in claim 1, further comprising:
   devices for mounting on a supporting rail.

10. The device as set forth in claim 1, wherein the at least two electronic components are selected from the group which includes varistors, TVS diodes, or gas-filled overvoltage arresters.

11. The device as set forth in claim 1, wherein the thermally softenable fixing means has a solder and/or an adhesive.

12. The device as set forth in claim 5, wherein the housing and/or the mechanically displaceable display means is made of a plastic material.

13. A system, comprising:
   a plurality of space-saving isolating arresters arranged next to one another, each space-saving isolating arrester including:
      at least two electronic components fastened to a carrier using a thermally softenable fixing means;
      an energy accumulator arranged on each of the at least two electronic components which, when the thermally softenable fixing means softens, displaces an associated electronic component of the at least two electronic components substantially parallel to the carrier, thereby disconnecting the associated electronic component; and
      a mechanically displaceable display means to indicate that one or more of the at least two electronic components has been disconnected, wherein the mechanically displaceable display means is displaced by a disconnecting electronic component, wherein the plurality of space-saving isolating arresters provide a common fault reporting in the normal direction toward a respective carrier.

14. The system as set forth in claim 13, wherein each mechanically displaceable display means has a fixing device for fixing the mechanically displaceable display means in a starting position.

15. The system as set forth in claim 13, wherein each space-saving isolating arrester further comprises:
   a fixing device for fixing a disconnected electronic component in a disconnected state.

16. The system as set forth in claim 14, wherein the fixing device and the mechanically displaceable display means for each space-saving isolating arrester are integrally formed with the fixing device being flexible relative to the mechanically displaceable display means.

17. The system as set forth in claim 13, wherein each space-saving isolating arrester further comprises:
   a housing with a first guide means being provided in the housing in order to guide the mechanical display means.

18. The system as set forth in claim 17, wherein a second guide means is provided in each housing in order to guide an electronic component to be disconnected.

19. The system as set forth in claim 13, wherein the energy accumulators are springs.

20. The system as set forth in claim 13, wherein the at least two electronic components are selected from the group which includes varistors, TVS diodes, or gas-filled overvoltage arresters.

* * * * *